United States Patent [19]

Matzek et al.

[11] 3,857,922

[45] Dec. 31, 1974

[54] STABILIZATION OF LIGHT METAL HYDRIDE

[76] Inventors: Norman E. Matzek, 1305 E. Ashman, Midland, Mich. 48645; Herbert C. Roehrs, Rte. No. 1, Beaverton, Mich. 48562

[22] Filed: July 13, 1965

[21] Appl. No.: 472,403

[52] U.S. Cl............ 423/275, 149/87, 423/645, 23/300, 23/305, 149/109
[51] Int. Cl............................................ C06b 19/00
[58] Field of Search........ 149/87, 109; 23/204, 300, 23/305; 423/645

[56] References Cited
OTHER PUBLICATIONS
Aluminum Hydride – A Literature Review, Hoffman, C. J., LMSD–703150; August 1960.

*Primary Examiner*—Stephen J. Lechert, Jr.
*Attorney, Agent, or Firm*—C. Kenneth Bjork

EXEMPLARY CLAIM

1. A crystalline, substantially non-ether solvated aluminum hydride having at least about .01 weight per cent magnesium incorporated into the crystal lattice thereof.

6 Claims, No Drawings

STABILIZATION OF LIGHT METAL HYDRIDE

This invention is concerned with the stabilization of light metal hydrides and more particularly is concerned with a novel process for improving the thermostability of substantially non-solvated crystalline aluminum hydride and to the resulting stabilized composition.

Light metal hydrides, e.g., substantially non-solvated, crystalline aluminum hydride, find utility as fuel components in solid rocket propulsion systems, as gas generators and in other similar operations. In particular, a substantially non-solvated, ether insoluble, crystalline aluminum hydride (hereinafter referred to as alpha-aluminum hydride) having a hexagonal crystal structure, a specific well-defined X-ray diffraction pattern and a density of over 1.4 grams per cubic centimeter has been found to be an especially desirable fuel for solid rocket propulsion systems. However, at temperatures above about 60° C. this material both during storage and when used in a propellant grain tends to undergo detrimental spontaneous decomposition with time liberating gaseous hydrogen.

Some increase in the thermostability of this and other non-solvated aluminum hydride materials has been realized by coating the surface of these compounds with either an inert coating or with materials which react with aluminum hydride to give a relatively inert surface layer.

Now, unexpectedly it has been found by the practice of the present invention that thermostabilization to a much greater magnitude than has been attained heretofore of light metal hydrides not having magnesium as a constituent, and particularly substantially non-solvated aluminum hydride, readily is achieved. Additionally, the present invention provides a stabilized product, the improved degree of thermostability of which is consistent and reproducible from product to product.

In accordance with the present invention, magnesium in an amount of at least about 0.01, usually from about 0.1 to about 3 or more weight per cent, based on the weight of a light metal hydride, is incorporated into the crystal lattice of the light metal hydride. With substantially non-solvated, crystalline aluminum hydride, preferably from about 0.4 to about 2 weight per cent of magnesium is incorporated into the lattice. The introduction of this component into the light metal hydride lattice markedly increases the thermostability over that shown by the non-magnesium containing product.

Ordinarily in carrying out the present process, a finely divided magnesium source material is added directly to the reaction mixture during the preparation of the light metal hydride. This assures that the magnesium is quite uniformly dispersed throughout the lattice in the resulting stabilized product.

In a preferred embodiment, a magnesium halide, e.g., magnesium chloride, and a liquid aromatic hydrocarbon, e.g., benzene, which is miscible with ether are introduced into and mixed with agitation in a reaction mixture of aluminum chloride and alkali metal aluminum hydride, e.g. $LiAlH_4$ or $NaAlH_4$ in ether, e.g. diethyl ether used to prepare aluminum hydride. Ordinarily the lithium aluminum hydride-aluminum chloride reactants range in a gram mole ratio of 3 to 4 ($LiAlH_4/AlCl_3$) based on that required stoichiometrically for aluminum hydride formation. Following the reaction period, ether is removed from the product mixture by heating at a temperature of from about 40° to about 140° C., ordinarily in the presence of a complex borohydride such as lithium borohydride, sodium boroydride or excess of the alkali metal aluminum hydride, thereby to provide a crystalline, substantially non-solvated aluminum hydride containing a predetermined amount of magnesium. Generally, the amount of complex hydride used is such that there is from about ¼ to about 1 mole of the complex hydride present for each mole of aluminum hydride product.

Usually, finely divided, substantially anhydrous magnesium source material, is added to an agitated reaction mixture. The resultant mix is stirred or otherwise agitated for a period of at least about 3 minutes, ordinarily from about 5 minutes to about 1.5 hours or more and usually from about 10 minutes to about 1 hour.

The temperatures employed are not critical, the process being operable at temperatures normally employed in light metal hydride preparation.

As is the usual practice in such preparations, for optimum yield and for high product purity, all manipulative and operating steps and material handling and storage procedures are to be carried out in an inert, substantially anhydrous atmosphere, e.g., nitrogen, argon and the like. Also, all reactants, solvents and carriers should be substantially moisture-free.

The process proceeds readily at atmospheric pressure although both superatmospheric and subatmospheric pressures can be employed, if desired.

The term "magnesium source material" as used herein includes magnesium salts, magnesium organometallics such as magnesium dialkyls and both binary and complex magnesium hydrides. Magnesium source materials particularly suitable for use in the present invention are the magnesium halides, magnesium perchlorate, magnesium carbonate, magnesium nitrate, magnesium sulfate, magnesium sulfide, magnesium acetate, magnesium aluminum hydride, magnesium hydride and the like. Generally, the efficiency, i.e., quantity of magnesium incorporated into the crystal lattice, increases directly as the solubility of the magnesium source material in the reaction mixture increases. In preparing a stabilized substantially non-solvated, crystalline aluminum hydride, magnesium halides have been found to be preferred magnesium source materials.

The products resulting from the present process consistently and reproducibly show a higher degree of thermostability than has been realized heretofore with untreated or surface coated light metal hydrides. However, it is to be understood that, if desired, the stabilized products of the present invention can be given a surface treatment to still further increase their stability as there is no detrimental reaction between the magnesium containing stabilized light metal hydride and the protective coatings ordinarily used to stabilize the light metal hydrides themselves.

The following Examples will serve to further illustrate the present invention but are not meant to limit it thereto.

EXAMPLE 1

A solution of aluminum hydride was prepared by mixing at room temperature about 0.066 gram mole of aluminum chloride in about 63 cubic centimeters of diethyl ether with about 0.25 gram mole of lithium aluminum hydride ($LiAlH_4$) dissolved in about 250 cubic centimeters diethyl ether. The resulting mixture was filtered through a medium glass frit to remove precipitated lithium chloride therefrom into a solution containing about 0.066 gram mole of lithium borohydride (LiBH$_4$) dissolved in about 63 cubic centimeters of diethyl ether. About 0.8 gram of ground magnesium chloride was added along with about 1925 cubic centimeters of benzene to this solution. About 447 cubic centimeters of diethyl ether were added to produce a solution containing 30 volume per cent with respect to the ether.

The resulting mixture was stirred for about 20 minutes, filtered into a reaction flask and the reaction flask connected to a distillation column. The reaction flask with the product solution was immersed in an oil bath maintained at approximately 105° C. and the ether removed by distillation over about a 2.5 hour period. The reaction vessel containing a white crystalline product was removed from the distillation column and the product washed with diethyl ether. The solid product was then dried at ambient temperature, i.e. ~18°–20° C, under a reduced pressure of about $1 \times 10^{-3}$ millimeter mercury absolute.

All manipulative and operating procedures were carried out in the presence of a substantially anhydrous nitrogen atmosphere and all reactants, solvents and liquid carriers were substantially moisture free.

Elemental analysis of the resulting white, crystalline product showed on a weight basis C-<0.1%, H-9.89%, Al-88.77%, Cl-0.20%, Li-0.27%, Mg-1.0%.

Unit cell dimensions as calculated from an X-ray powder diffraction pattern of the hexagonal crystal structure product taken with an AEC Guinier type focusing camera were found to be $a=4.453_4$A, $C=5.916_5$A. The unit cell dimensions calculated for an alpha-alluminum hydride product prepared by the same procedure as described directly hereinbefore except that no magnesium values were added to the reaction mixture were $a=4.450_2$A, $C=5.906_6$A. The increase in lattice constants for the magnesium containing product indicates the magnesium values are incorporated into the crystal lattice structure of the aluminum hydride giving an expanded unit cell.

The thermostability of these magnesium containing aluminum hydride and aluminum hydride products as well as a commercial lithium aluminum hydride product were separately evaluated. For this study, the samples were subjected to a temperature of about 100° C. while being subjected to a starting reduced pressure of about $1 \times 10^{-2}$ millimeter mercury absolute. The per cent total decomposition over the test period, as calculated from gas evolution and analysis, was determined for each product. Lithium aluminum hydride, recognized as being relatively stable, was utilized as a control in this study.

The results of this study are presented in Table I which follows.

Table I

| Run No. | Time on Test (hrs.) | Per Cent Decomposition | | |
|---|---|---|---|---|
| | | AlH$_3$ with Mg | AlH$_3$ | LiAlH$_4$ |
| 1 | 10 | 1 | 42.5 | 10 |
| 2 | 20 | 5 | 82.5 | 40 |
| 3 | 30 | 10 | 100 | 61 |
| 4 | 40 | 17 | do. | 70 |
| 5 | 50 | 23 | do. | 72 |
| 6 | 60 | 30 | do. | 77 |

Table I-Continued

| Run No. | Time on Test (hrs.) | Per Cent Decomposition | | |
|---|---|---|---|---|
| | | AlH$_3$ with Mg | AlH$_3$ | LiAlH$_4$ |
| 7 | 80 | 48 | do. | 80 |
| 8 | 130 | 78 | do. | 90 |
| 9 | 160 | 88 | do. | 93 |

EXAMPLE 2

The procedure described for Example 1 was followed in preparing a number of substantially non-ether solvated, crystalline aluminum hydride products having differing quantities of magnesium in the crystal lattice.

Samples of the white, hexagonal crystalline pattern products were subjected to a temperature of about 100° C. at a reduced pressure of about $1 \times 10^{-2}$ millimeter mercury absolute and the time to reach 50 per cent decomposition noted. The results of this study are summarized in Table II.

Table II

| Run No. | Mg in AlH$_3$ (% by wt.) | Time to reach 50% decomposition (hours) |
|---|---|---|
| 1 | (no additive-control) | 8.0 |
| 2 | 0.002–0.005 | 10–21 |
| 3 | 0.01–0.02 | 24 |
| 4 | 0.2–0.3 | 24–34 |
| 5 | 0.4 | 41 |
| 6 | 1.0 | 84.6 |

In a separate study, samples of substantially anhydrous, crystalline aluminum hydride magnesium containing products were tested at 60° C. under about one atmosphere nitrogen. The results of this study are summarized in Table III.

Table III

| Run No. | Mg in AlH$_3$ (% by wt.) | Time to reach 1% decomposition (hours) |
|---|---|---|
| 1 | (no additive-control) | 5.6 |
| 2 | 0.2 | 6.6 |
| 3 | 0.3 | 7.7 |
| 4 | 0.4 | 12.0 |
| 5 | 0.8 | 20.0 |

EXAMPLE 3

A hexagonal crystal form, substantially non-ether solvated aluminum hydride having about 1.9 weight per cent magnesium in the crystal lattice was prepared following the general procedure described in Example 1.

The thermostability of this product was evaluated at 100° C. in a reduced pressure of about $1 \times 10^{-2}$ millimeter mercury absolute. For a control, a commercial lithium aluminum hydride was tested in the same test assembly. The total decomposition for these samples over a period of time is shown in Table IV.

Table IV

| Run No. | Time on Test (hours) | Decomposition (Per Cent) | |
|---|---|---|---|
| | | AlH$_3$ with Mg | LiAlH$_4$ |
| 1 | 40 | 1 | 15 |
| 2 | 80 | 4 | 55 |

Table IV-Continued

| Run No. | Time on Test (hours) | Decomposition (Per Cent) AlH₃ with Mg | LiAlH₄ |
|---|---|---|---|
| 3 | 120 | 9 | 68 |
| 4 | 160 | 16 | 76 |
| 5 | 200 | 22 | 80 |
| 6 | 240 | 30 | 85 |
| 7 | 280 | 38 | 90 |
| 8 | 320 | 46 | 92 |
| 9 | 360 | 55 | 97 |

EXAMPLE 4

Products of a hexagonal crystal form, substantially non-solvated aluminum hydride having predetermined quantities of magnesium in the lattice were prepared by following the procedure described for Example 1.

The resulting white, crystalline products were then placed in a substantially anhydrous nitrogen atmosphere at about 60° C. The time required for the products to reach one per cent decomposition was determined. Table V summarizes the results.

Table V

| Run No. | AlH₃ Composition % Mg in P'd't | Time for 1 per cent Decomposition (days) |
|---|---|---|
| 1 | 0 | 5 |
| 2 | 0.4 | 9 |
| 3 | 0.8 | 13 |
| 4 | 1.2 | 17.5 |
| 5 | 1.6 | 22 |
| 6 | 2.0 | 26 |

In a manner similar to that described for the foregoing Examples, other magnesium source materials as set forth hereinbefore can be utilized to provide light metal hydride compositions having increased thermal stability. In particular other magnesium halides, i.e., magnesium fluoride, magnesium bromide, and magnesium iodide can be used as reactants to incorporate magnesium into non-ether solvated, crystalline hexagonal or rhombahedral aluminum hydride materials thereby to markedly increase the thermostability of these products.

Various modifications can be made in the present invention without departing from the spirit or scope thereof for it is understood that we limit ourselves only as defined in the appended claims.

We claim:

1. A crystalline, substantially non-ether solvated aluminum hydride having at least about .01 weight per cent magnesium incorporated into the crystal lattice thereof.

2. A hexagonal crystalline, substantially non-ether solvated aluminum hydride, said hydride having from about 0.1 to about 3 weight per cent magnesium incorporated into the crystal lattice thereof.

3. A hexagonal crystalline, substantially non-ether solvated aluminum hydride, said hydride having from about 0.4 to about 2 weight per cent magnesium incorporated into the crystal lattice thereof.

4. A process for increasing the thermostability of a light metal hydride which comprises;
   a. providing a reaction mixture for the preparation of a light metal hydride not having magnesium as a constituent,
   b. adding a finely divided magnesium source material to said reaction mixture, the quantity of said magnesium source material being that required to provide at least about 0.01 weight per cent magnesium in the light metal hydride product,
   c. agitating the resulting magnesium containing light metal hydride reaction mixture for a period of at least about 3 minutes, and
   d. recovering a light metal hydride having at least about 0.01 weight per cent magnesium in the crystal lattice thereof.

5. A process for preparing a substantially non-ether solvated, crystalline aluminum hydride product having an improved thermostability which comprises;
   a. providing an ethereal reaction mass of aluminum chloride and an alkali metal aluminum hydride, the mol ratio of said alkali metal aluminum hydride/aluminum chloride in the reaction mass ranging from about 3 to about 4, said ethereal mass also containing from about ¼ to about 1 mole of a complex metal hydride selected from the group consisting of lithium borohydride, sodium borohydride or excess of the alkali metal aluminum hydride per mole of aluminum hydride product,
   b. introducing into said ethereal reaction mass a finely divided magnesium halide in an aromatic, liquid hydrocarbon soluble in said ether, said magnesium halide being present in an amount to provide from about 0.1 to about 3 weight per cent magnesium in the final aluminum hydride product,
   c. agitating the resulting mixture for a period of from about 5 minutes to about 1.5 hours,
   d. removing said ether while heating the resulting product mixture at a temperature of from about 45° to about 140° C. thereby precipitating a substantially non-ether solvated, crystalline aluminum hydride product having from about 0.1 to about 3 weight per cent magnesium in the crystal lattice, and
   e. recovering said aluminum hydride product.

6. The process as defined in claim 5 wherein the magnesium halide is magnesium chloride.

* * * * *

PO-1050
(5/69)

UNITED STATES PATENT OFFICE
CERTIFICATE OF CORRECTION

Patent No. 3,857,922          Dated December 31, 1974

Inventor(s) Norman E. Matzek and Herbert C. Roehrs

It is certified that error appears in the above-identified patent and that said Letters Patent are hereby corrected as shown below:

Insert:

--Assignee: The Dow Chemical Company
           Midland, Michigan--.

Signed and sealed this 15th day of April 1975.

(SEAL)
Attest:

RUTH C. MASON
Attesting Officer

C. MARSHALL DANN
Commissioner of Patents
and Trademarks